No. 785,122. Patented March 21, 1905.

UNITED STATES PATENT OFFICE.

ROBERT E. SCHMIDT, OF ELBERFELD, GERMANY, ASSIGNOR TO FARBEN-FABRIKEN OF ELBERFELD CO., OF NEW YORK, N. Y., A CORPORATION OF NEW YORK.

GREEN-BLUE ANTHRAQUINONE DYE.

SPECIFICATION forming part of Letters Patent No 785,122, dated March 21, 1905.

Application filed December 20, 1904. Serial No. 237,707.

*To all whom it may concern:*

Be it known that I, ROBERT E. SCHMIDT, doctor of philosophy, chemist, residing at Elberfeld, Germany, (assignor to the FARBENFABRIKEN OF ELBERFELD Co., of New York,) have invented a new and useful Improvement in New Anthracene Dye; and I hereby declare the following to be a clear and exact description of my invention.

My invention relates to the manufacture of a new dyestuff which can be obtained by treating with formic aldehyde and sulfuric acid the blue die obtainable by melting beta-amidoanthraquinone with caustic potash, (United States Letters Patent No. 682,523, dated September 10, 1901.)

In carrying out the process practically I can proceed as follows, the parts being by weight: Ten parts of the dyestuff obtainable by melting beta-amidoanthraquinone with caustic potash (United States Letters Patent No. 682,523, dated September 10, 1901) are dissolved in two hundred parts of sulfuric acid, (66° Baumé.) To the resulting solution ten parts of a forty-per-cent. solution of formic aldehyde are slowly added with stirring and taking care that the temperature does not rise higher than 50° centigrade. It is stirred at this temperature until flakes of a greenish-blue color are obtained on pouring a test portion into water. (The sulfuric-acid solution of the initial material gives reddish-blue, almost violet, flakes on being mixed with water.) When the reaction is thus proved to be complete, the mass is stirred into two thousand parts of water, and the precipitate thus obtained is filtered off and washed with water. The new dyestuff is thus obtained in the shape of a greenish-blue paste suitable for dyeing in the "vat." After being dried and pulverized the coloring-matter forms a dark-blue powder. It is in some degree more easily soluble in boiling pyridin and anilin and with a very marked greener color than the initial material. It is dissolved by concentrated sulfuric acid with an olive-brown color.

Upon treatment with hydrosulfite of sodium and caustic-soda lye the dyestuff is transformed into its hydro compound, a greenish-blue vat being thus obtained which dyes cotton greenish-blue pure and fast shades.

Having now described my invention and in what manner the same is to be performed, what I claim as new, and desire to secure by Letters Patent, is—

The herein-described new dyestuff which can be obtained by treating with formic aldehyde and sulfuric acid the dyestuff described in United States Letters Patent No. 682,523, dated September 10, 1901, which dyestuff forms after being dried and pulverized a dark-blue powder soluble in concentrated sulfuric acid with an olive-brown color; being transformed into its hydro compound on suitable reduction with hydrosulfite and caustic-soda lye, the alkaline solution thus obtained exhibiting the typical properties of a "vat" which dyes unmordanted cotton greenish-blue shades, substantially as hereinbefore described.

In testimony whereof I have signed my name in the presence of two subscribing witnesses.

ROBERT E. SCHMIDT.

Witnesses:
OTTO KÖNIG,
HEINR. AHLEFELDER.